US007778525B2

(12) United States Patent
Lee

(10) Patent No.: US 7,778,525 B2
(45) Date of Patent: Aug. 17, 2010

(54) METHOD OF PREVENTING AUDIO OR VIDEO FROM INTERRUPTION DUE TO THE OTHER FOR A MIX MODE MULTIMEDIA PLAYER

(75) Inventor: Scot Lee, Hsin Tien (TW)

(73) Assignee: Via Technologies, Inc., Hsin Tien, Taipei Hsien (TW)

( * ) Notice: Subject to any disclaimer, the term of this patent is extended or adjusted under 35 U.S.C. 154(b) by 1062 days.

(21) Appl. No.: 11/489,596

(22) Filed: Jul. 20, 2006

(65) Prior Publication Data

US 2006/0257121 A1 Nov. 16, 2006

Related U.S. Application Data

(63) Continuation-in-part of application No. 11/186,814, filed on Jul. 22, 2005.

(60) Provisional application No. 60/590,335, filed on Jul. 23, 2004.

(51) Int. Cl.
*H04N 5/91* (2006.01)
*H04N 7/26* (2006.01)

(52) U.S. Cl. .................................. 386/96; 386/124

(58) Field of Classification Search ............. 386/96, 386/124, 125, 46, 98, 100
See application file for complete search history.

(56) References Cited

U.S. PATENT DOCUMENTS

2005/0273826 A1\* 12/2005 Sakane ..................... 725/89
2006/0012709 A1\* 1/2006 Yamada et al. ............. 348/515

\* cited by examiner

*Primary Examiner*—Robert Chevalier
(74) *Attorney, Agent, or Firm*—Thomas, Kayden, Horstemeyer & Risley, LLP

(57) ABSTRACT

A method of preventing playing of audio or video data from being interrupted for a mix mode multimedia playback system comprises the following steps: a video stream buffer, a audio stream buffer, and a parser module is provided; then amount of free space in the video stream buffer is checked so as to ensure the amount of the free space is larger than a sum of a track buffer and video data being processed by the parser module. Whenever the playing of an audio scene state machine is paused or stopped, audio data processed by the parser module and audio data in the track buffer are pushed into the free space of the audio stream buffer so as to release entire space of the track buffer for video data to be loaded. On the other hand, whenever the playing of a video scene state machine is paused or stopped, the video data processed by the parser module and video data in the track buffer are pushed into the free space of the video stream buffer so as to release entire space of the track buffer for audio data to be loaded.

11 Claims, 2 Drawing Sheets

METHOD OF PREVENTING AUDIO OR VIDEO FROM INTERRUPTION DUE TO THE OTHER FOR A MIX MODE MULTIMEDIA PLAYER

This application is a Continuation-In-Part of co-pending application Ser. No. 11/186,814 filed on Jul. 22, 2005, which claims priority under 35 U.S.C. §119(e) on U.S. Provisional Application No. 60/590,335 filed on Jul. 23, 2004, the entire contents of all of which are hereby incorporated by reference and for which priority is claimed under 35 U.S.C. §120.

FIELD OF INVENTION

The present invention is related to a multimedia player, particularly, to a mix mode multimedia player that is capable of controlling audio format files and video format files independently.

BACKGROUND OF THE INVENTION

In 21-century, our amusements become more variety than ever before. People can acquire information of about scenic spots of historical significance around the whole world scenery, or enjoy those pleasured and famous films at home just through a digital video disc (DVD) player. The DVD player plays the discs with extremely high quality to be good to hear and see as you are personal on the scene. People can get certain degree of satisfactions on scene organs without going to theater. Still a further benefit is that you can enjoy any sections in the film repeatedly without any restriction.

Under the considerations of cost down and designing products with more capabilities in competitions, IC manufacturers endeavor to integrate their IC chips with more and more functions, such that a typical DVD player usually can play multimedia files in variety formats recorded on multimedia disc such as DVD, VCD, SVCD, CDR, CDRW etc. For example, those file formats including mpeg, jpeg, mp3, mp4, and wav, could be played by a conventional DVD player. However, the conventional DVD player cannot control playing operations of video and audio data separately or independently, because those video and audio data are usually encoded in the conventional multimedia files interleavingly. Accordingly, a user cannot control a conventional DVD player to a file with pure audio data; meanwhile to control the DVD player to play another file with pure video data. Moreover, it is also impossible for a user to set playing controls independently, such as stopping or pausing a current playing operation, or actuating a forward- or backward-winding operation on those of audio format data or video format data while the DVD player is just playing them.

SUMMARY OF THE INVENTION

A method of configuring a mix mode multimedia player with a function of controlling audio format file and video format file individually and independently is disclosed.

The method comprises the following steps. At first, a mix mode multimedia player having a parser module is configured to have at least a video stream buffer and an audio stream buffer. Thereafter, an amount of free space in the video stream buffer is checked so as to ensure the amount of free space is larger than a sum of video data of a track buffer and video data being currently processed by the parser module. Whenever the playing of an audio scene state machine is paused or stopped, audio data which is currently processed by the parser module and audio data in the track buffer are pushed into free space of the audio stream buffer so as to release entire space of said track buffer for video data to be loaded. On the other hand, whenever the playing of a video scene state machine is paused or stopped, the video data which is currently processed by the parser module and video data in the track buffer are pushed into free space of the video stream buffer so as to release entire space of said track buffer for audio data to be loaded.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTIONS OF THE INVENTION

The present invention is to provide a method for a mix mode multimedia player to prevent audio or video data playing from being interrupted or affected by the other. According to an embodiment of the present invention, the stream buffer including a video stream buffer and an audio stream buffer are real-time examined to check any available space of each so that the playing of the video scene will not be terminated just due to the playing of the audio scene is forced to be stopped or paused for the playing of audio scene.

Figure 1:
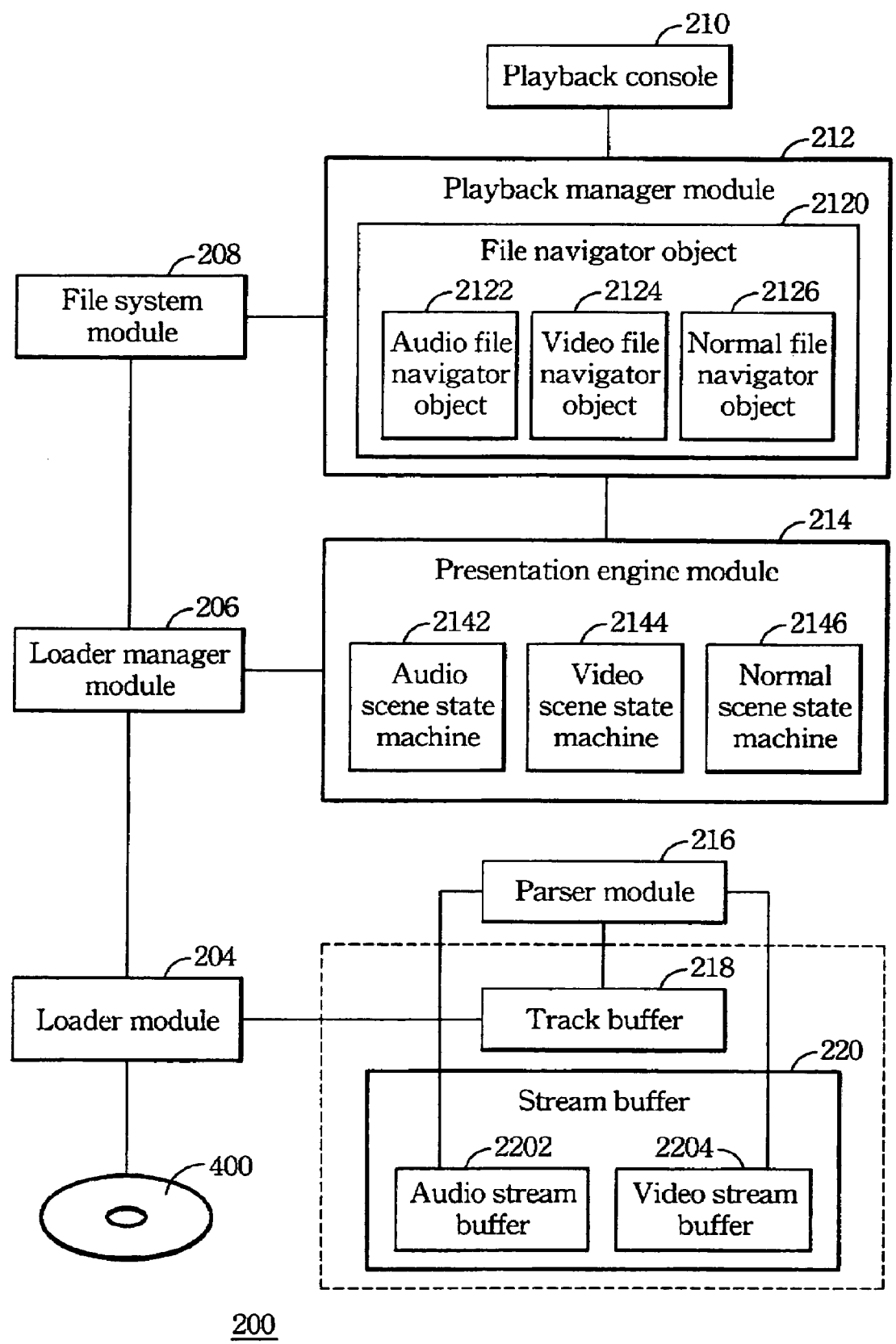
FIG. 1 shows function blocks of a mixed mode multimedia player according to the present invention.

Referring to FIG. 1, it shows function blocks of a multimedia playback system 200 in accordance with an embodiment of the present invention. The multimedia playback system 200 comprises a loader module 204, a loader manger module 206, a file system module 208, a playback console 210, a playback manger module 212, a presentation engine module 214, a parser module 216, a track buffer 218, and a stream buffer 220. The playback manager module 212 further comprises a file navigator object 2120.

Preferably, the file system module 208 is to provide the playback manager module 212 a plurality of files recorded on the media with their file names and locations, i.e. logical block addressing allocations for playback manger module 212, so that a user can arrange his favorite play list settings according to the file names on the playback console 210. Accordingly, the playback manager module 212 generates an audio format play list, a video format play list, and/or an audio-video interleaving play list according to user settings. The file navigator object 2120 processes the play lists and then individually classifies them to appropriate navigation modules, such as audio file navigator object 2122, video file navigator object 2124 and normal file navigator object 2026.

The file navigator object 2120 serves as a role of arranging the playing sequence in accordance with the audio play list and video play list stored in the playback manager module 212, while the arranged results are used as references of successive playing sequences. The presentation engine module 214 includes an audio scene state machine 2142, a video scene state machine 2144, and a normal scene state machine 2146. The presentation engine module 214 provides a corresponding audio scene state machine 2142 according to the audio playing sequence of the audio file navigator object 2122, wherein the file to be played by the audio scene state machine 2142 is encoded by following an audio format so that the user may operate the file independently. Beside, the presentation engine module 214 also provides a corresponding video scene state machine 2144 according to the video playing sequence of the video file navigator object 2124, and the file to be played by the video scene state machine 2144 may be encoded by following a video format for the sake of operating independently.

In addition to the above two scene state machines, the normal scene state machine 2146 may be used to play a video and audio interleaving encoded file. Please note that both of the audio scene state machine 2142 and the video scene state machine 2144 are capable of setting playing sequences, respectively, such that both of these scene state machines may be enabled and existed for playback. Moreover, the normal scene state machine 2146 may be activated and existed independently since it lacks the capability of setting playing sequences as the other two.

As the file to be played is an audio file, the audio file navigator object 2122 of the audio scene state machine 2142 provides commands including PLAY, PAUSE, STOP, PREVIOUS, or NEXT and so on, as controls from a user. On the other hand, as the file to be played is a video one, the video file navigator object 2124 of the video scene state machine 2142 provides the user with commands including PLAY, PAUSE, STOP, PREVIOUS, or NEXT and so on. The normal scene state machine 2146 provides the same functions of both of the audio file navigator object 2122 and the video file navigator object 2124.

Figure 2:
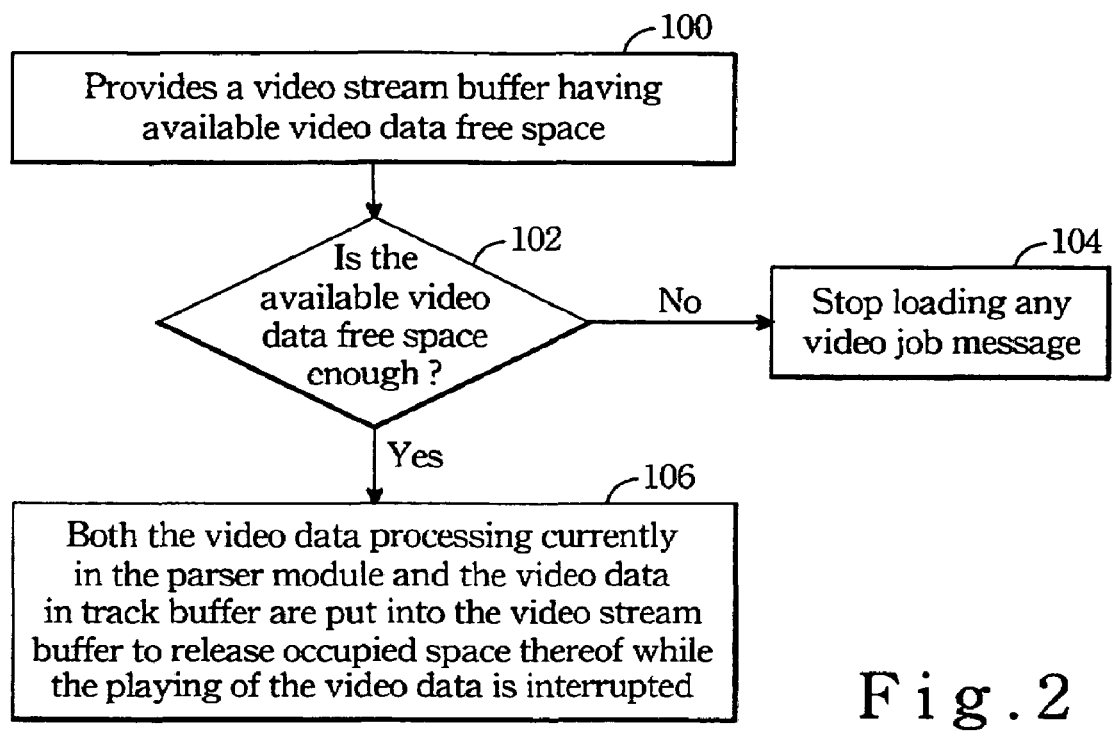
FIG. 2 shows a flow char of preventing a playing of audio data from interrupted while the portion of playing video data are interrupted in accordance with the present invention.

According to the architecture of the present invention, the mix mode multimedia player can prevent the video playing or audio playing being interrupted or affected due to forgoing one of commands. The portion of non-interrupted on audio playing is depicted as follows. Please refer to FIGS. 2 and 3, a video stream buffer 2204 having available video data space 22042 is provided in block 100. Thereafter, in block 102, the amount of video data available space is monitored by the loader manger module 206. The loader manger module 206 examines the available video data space 22042 according to an examining procedure associated with a current job message to ensure whether the available space 22042 is larger than a sum of both the video data currently in tracker buffer 218 and the maximum video data capacity that the parser module 216 can handle.

If the available video space 22042 of video stream buffer 2204 is insufficient, the loader manger module 206 will not load in any video job message and then a "Full" status is set during an examination procedure in block 104. However, the loader manger module 206 may still load next audio job-request message continuously.

On the other hand, if the results of the examining procedure indicate the available video space of video stream buffer is sufficient, when the operation of playing video data being halted or terminated, the parser module 216 may load both of the video data that is processing currently and that stored in the video stream buffer 218 into the available video space 22042 in block 106. Please note that the parser module 216 stores video data which is ready for encoding into the available video space 22042, while the video data stored in the video stream buffer 218 is also stored in the available video space 22042 by means of the parser module 216. Consequently, the occupied space in the track buffer 218 may be released such that the loader module 206 may continue the successive jobs of loading audio-related messages into the track buffer 218.

Figure 3:
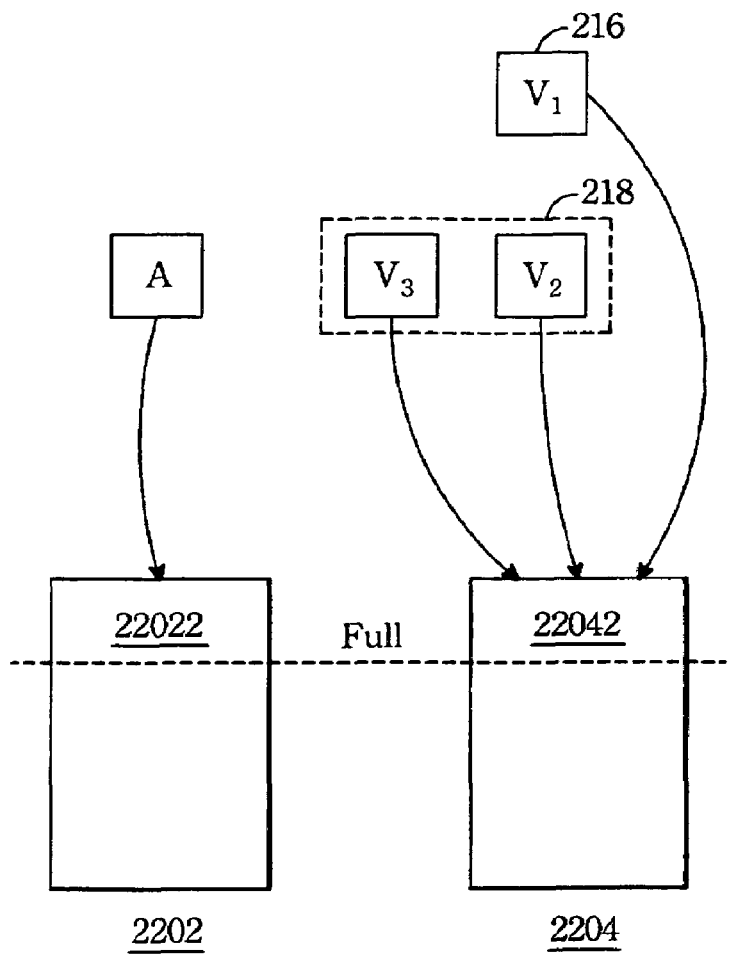
FIG. 3 shows a schematic diagram of data in the parser module and in the track buffer are put into a video stream buffer while the playing of the video data is interrupted so that the space of the track buffer and parser are release for audio data.

In FIG. 3 of the an embodiment, the stream buffer includes the audio stream buffer 2202 having available audio space 22022 and a video stream buffer 2204 having available video space 22024. Assume that there are video and audio data playing, including three records of video data of V1, V2, and V3 and one record of audio data A1 to be decoded. No matter what video or audio data are, each record has a size of about 16 kB (kilo bytes). In an example, the V1 and A1 are video and audio data to be moved respectively. The V2 and V3 are video data stored in the track buffer 218. If the user desires to set a PAUSE or STOP command to a video data being currently played, the available space of video data 22024 may be larger than 48 kB (V1+V2+V3=48 kB) so as to ensure all the video data to be pushed to the available video space 22024 and thus release the track buffer 218. Subsequence, the parser module 216 loads the successive audio data, record A, into the available audio space 22022. Consequently, the operation of playing the audio data may be continued without undesired interruptions by user commands, such as PAUSE or STOP to the video scene state machine 2142.

In summary, the mixed mode multimedia player of the present invention has at least the following advantages.
1. The media file (video or audio data) can be independently scheduled according to user favorite. No additional hardware is demanded.
2. The playing of the media file (audio and/or video) can be individually forced to pause, without interrupting the other one.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A method of preventing playing of audio or video data from being interrupted for a mix mode multimedia playback system, said method comprising the steps of:

providing a video stream buffer, an audio stream buffer, and a parser module;

examining amount of free space in said video stream buffer so as to ensure amount of the free space is larger than a sum of video data in a track buffer and video data being processed by said parser module;

examining amount of free space in said audio stream buffer so as to ensure amount of the free space is larger than a sum of audio data of said track buffer and audio data being processed by said parser module;

if amount of the free space is larger than a sum of video data of said track buffer and video data being processed by said parser module, pushing said video data processed by said parser module and video data in said track buffer into said free space of said video stream buffer at the same time while playing of an video scene state machine is paused or stopped so as to release entire space of said track buffer for audio data to be loaded; and if amount of the free space is larger than a sum of audio data of said track buffer and audio data being processed by said parser module, pushing said audio data processed by said parser module and audio data in said track buffer into said free space of said video stream buffer at the same time while playing of an audio scene state machine is paused or stopped so as to release entire space of said track buffer for video data to be loaded.

2. The method according to claim 1 further comprising the steps of:

stopping loading any video job message when the examination result shown amount of said free space in said video stream buffer is smaller than the sum of said track buffer and video data being processed by said parser module; and stopping loading any audio job message when the examination result shown amount of said free space in said audio stream buffer is smaller than the sum of said track buffer and audio data being processed by said parser module.

3. The method according to claim 2 wherein said step of topping loading any video job message further comprising setting the examination result as "FULL" so that the next record of data to be loaded by a loader manager module is a record of audio data.

4. The method according to claim 2 wherein said step of topping loading any audio job message further comprising setting the examination result as "FULL" so that the next record of data to be loaded by a loader manager module is a record of video data.

5. The method according to claim 1, wherein said track buffer contains one record of audio data or one record of video data.

6. A method of preventing playing of video data from being interrupted by audio data playing for a mix mode multimedia playback system, said method comprising the steps of:

providing a video stream buffer and a parser module;

examining amount of free space in said video stream buffer so as to ensure the free spaces is larger than a sum of video data in a track buffer and video data being processed by said parser module;

if amount of the free space is larger than a sum of video data of said track buffer and video data being processed by said parser module, pushing said video data processed by said parser module and video data in said track buffer into said free space of said video stream buffer at the same time while playing of an video scene state machine is paused or stopped so as to release entire space of said track buffer for audio data to be loaded.

7. The method according to claim 6 further comprising the steps of:

stopping loading any video job message when the examination result shown amount of free space in said video stream buffer is smaller than the sum of one track buffer and video data being processed by said parser module.

8. The method according to claim 7 wherein said step of topping loading any video job message further comprising setting the examination result as "FULL" so that the next record of data to be loaded by a loader manager module is a record of audio data.

9. A method of preventing playing of audio data from being interrupted by video data playing for a mix mode multimedia playback system, said method comprising the steps of:

providing an audio stream buffer and a parser module;

examining amount of free space in said audio stream buffer so as to ensure the amount of free space is larger than a sum of audio data of a track buffer and audio data being processing by said parser module;

pushing said audio data processed by said parser module and audio data in said track buffer into said free space of said audio stream buffer at the same time when playing of an audio scene state machine is paused or stopped so as to release entire space of said track buffer for video data to be loaded.

10. The method according to claim 9 further comprising the steps of:

stopping loading any audio job message when the examination result shown amount of said free space in said audio stream buffer is smaller than the sum of audio data of said track buffer and audio data being processed by said parser module.

11. The method according to claim 10 wherein said step of topping loading any audio job message further comprising setting the examination result as "FULL" so that the next record of data to be loaded by a loader manager module is a record of video data.

* * * * *